United States Patent
Lee et al.

(10) Patent No.: US 11,436,760 B2
(45) Date of Patent: Sep. 6, 2022

(54) ELECTRONIC APPARATUS AND CONTROL METHOD THEREOF FOR REDUCING IMAGE BLUR

(71) Applicant: SAMSUNG ELECTRONICS CO., LTD., Suwon-si (KR)

(72) Inventors: Wonwoo Lee, Suwon-si (KR); Taehyuk Kwon, Suwon-si (KR); Deokho Kim, Suwon-si (KR); Byeongwook Yoo, Suwon-si (KR); Gunill Lee, Suwon-si (KR); Jaewoong Lee, Suwon-si (KR); Sunghoon Yim, Suwon-si (KR); Jiwon Jeong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/577,121

(22) Filed: Sep. 20, 2019

(65) Prior Publication Data
US 2020/0202576 A1 Jun. 25, 2020

(30) Foreign Application Priority Data
Dec. 19, 2018 (KR) .................. 10-2018-0164797

(51) Int. Cl.
*G06T 9/00* (2006.01)
*H04N 5/232* (2006.01)
(Continued)

(52) U.S. Cl.
CPC .......... *G06T 9/002* (2013.01); *G02B 27/0101* (2013.01); *G02B 27/0172* (2013.01);
(Continued)

(58) Field of Classification Search
CPC ......... G06T 9/002; G06T 19/006; G06T 7/30; G06T 7/38; G06T 11/60; G06T 3/4038;
(Continued)

(56) References Cited

U.S. PATENT DOCUMENTS 8,073,259 B1 * 12/2011 Jin ..................... G06T 3/4038
382/190
9,824,455 B1 11/2017 Singh et al.
(Continued)

FOREIGN PATENT DOCUMENTS

EP 2 017 783 A2 1/2009
JP 2015-222864 A 12/2015
(Continued)

OTHER PUBLICATIONS

Matthew Brown and David G. Lowe, Automatic Panoramic Image Stitching using Invariant Features, first online version published in Dec. 2006, International Journal of Computer Vision 74(1) pp. 59-73. (Year: 2007).*

(Continued)

*Primary Examiner* — Jeffery A Brier
(74) *Attorney, Agent, or Firm* — Sughrue Mion, PLLC

(57) ABSTRACT

An electronic apparatus obtains a panoramic image by overlapping partial areas of image frames and identifies an object from the panoramic image or an area of a predetermined shape of maximum size within the panoramic image.

18 Claims, 18 Drawing Sheets

(51) Int. Cl.
　　　*G06T 19/00*　　　(2011.01)
　　　*G02B 27/01*　　　(2006.01)

(52) U.S. Cl.
　　　CPC ....... *G06T 19/006* (2013.01); *H04N 5/23267* (2013.01); *G02B 2027/014* (2013.01); *G02B 2027/0178* (2013.01)

(58) Field of Classification Search
　　　CPC . G06T 7/73; G06T 7/11; G06T 1/0007; G06T 1/60; G06T 5/50; G06T 7/215; G06T 2200/24; G06T 2200/28; G06T 2207/20081; G06T 2207/20084; G02B 27/0101; G02B 27/0172; G02B 2027/014; G02B 2027/0178; H04N 5/23267; H04N 5/23254; H04N 5/2624; H04N 5/23238; H04N 5/225; G06V 10/16; G06V 30/141; G06V 20/20; G06F 3/005; G06F 3/011
　　　See application file for complete search history.

(56) References Cited

U.S. PATENT DOCUMENTS

| | | | |
|---|---|---|---|
| 10,430,925 | B2 | 10/2019 | Sugaya |
| 2007/0003164 | A1 | 1/2007 | Takata et al. |
| 2012/0206618 | A1 | 8/2012 | Albu et al. |
| 2013/0063485 | A1 | 3/2013 | Kita |
| 2014/0300596 | A1* | 10/2014 | Liu .................. G06T 5/006 345/419 |
| 2017/0116709 | A1 | 4/2017 | Wang et al. |
| 2018/0007269 | A1 | 1/2018 | Sclar et al. |
| 2018/0041716 | A1 | 2/2018 | Kajimura et al. |
| 2019/0180413 | A1 | 6/2019 | Sugaya |

FOREIGN PATENT DOCUMENTS

| | | |
|---|---|---|
| JP | 6267809 B1 | 1/2018 |
| JP | 2018-22964 A | 2/2018 |
| KR | 10-2008-0021441 A | 3/2008 |
| KR | 10-2018-0078576 A | 7/2018 |
| WO | 2017/115348 A1 | 7/2017 |

OTHER PUBLICATIONS

Naoki Chiba, Hiroshi Kano, Michihiko Minoh, and Masashi Yasuda, Feature-Based Image Mosaicing, 2000, Systems and Computers in Japan, vol. 31, No. 7, 2000, Translated from Denshi Joho Tsushin Gakkai Ronbunshi, vol. J82-D-II, No. 10, Oct. 1999, pp. 1581.1589. (Year: 2000).*

International Search Report (PCT/ISA/210) dated Jan. 20, 2020 issued by the International Searching Authority in counterpart International Patent Application No. PCT/KR2019/012696.

Written Opinion (PCT/ISA/237) dated Jan. 20, 2020 issued by the International Searching Authority in counterpart International Patent Application No. PCT/KR2019/012696.

Wang, Miao et al., "Deep Online Video Stabilization", Cornell University, Feb. 22, 2018, http://arxiv.org/abs/1802.08091. (8 pages total).

Communication dated Sep. 30, 2021, issued by the European Patent Office in European Application No. 19898941.0.

* cited by examiner

ELECTRONIC APPARATUS AND CONTROL METHOD THEREOF FOR REDUCING IMAGE BLUR

CROSS-REFERENCE TO RELATED APPLICATIONS

This application claims priority from Korean Patent Application No. 10-2018-0164797, filed on Dec. 19, 2018, in the Korean Intellectual Property Office, the disclosure of which is herein incorporated by reference in its entirety.

BACKGROUND

1. Field

Devices and methods consistent the disclosure relate to an electronic apparatus and a controlling method thereof, and more particularly, to an electronic apparatus for identifying an object and a controlling method thereof.

The disclosure also relates to an artificial intelligence (AI) system that simulates functions, such as recognition and judgment, of a human brain using a machine learning algorithm and its application.

2. Description of the Related Art

Recently, artificial intelligence systems that implement human-level artificial intelligence (AI) have been deployed in various fields. An artificial intelligence system is a system embodied in a machine which learns, judges and iteratively improves execution of its function, unlike a conventional rules-based smart system. For example, as use of the artificial intelligence system increases, a recognition rate and the understanding of user's preferences may commensurately increase. Thus, the conventional rule-based smart system has been gradually replaced with a deep-learning based artificial intelligence system.

Artificial intelligence technology consists of machine learning (e.g., deep-learning) and element technologies that implement machine learning.

Machine learning is an algorithmic technology that classifies and/or trains the characteristics of input data. Element technology is a technology that simulates functions, such as recognition and judgment of the human brain, using a machine learning algorithm, such as deep learning, and includes linguistic understanding, visual understanding, reasoning/prediction, knowledge representation, motion control, etc.

Artificial intelligence technology may be applied to various fields, examples of which are described below. Linguistic understanding is a technology for recognizing and applying/processing human language/characters, including natural language processing, machine translation, dialogue system, query response, speech recognition/synthesis, and the like. Visual comprehension is a technology for recognizing and processing an object as if perceived by a human being, including object recognition, object tracking, image search, human recognition, scene understanding, spatial understanding, image enhancement, etc. Inference prediction is a technology for judging and logically inferring and predicting information, including knowledge/probability-based reasoning, optimization prediction, preference-bases planning, and recommendations. Knowledge representation is a technology for automating human experience information into knowledge data, including knowledge building (data generation/classification) and knowledge management (data utilization). Motion control is a technology for controlling the autonomous movements of a device or object, e.g., travel of a vehicle and the motion of a robot, including motion control (navigation, collision and traveling), operation control (behavior control), and the like.

Recently, various types of devices, such as a glasses device including a camera, have been developed. However, when capturing an object using the camera provided in the glasses device, image blur may occur owing to motion of a user's head or body. For example, referring to FIG. 1, a glasses device may include a camera, and image blur may occur in the image captured by the camera as a result of movement by the user.

Image blur may cause obstacles to augmented reality (AR) services requiring real-time image analysis, and that identification and tracking of objects may be difficult.

Accordingly, a stabilization method for eliminating image blur has been developed. However, setting a parameter for each image frame may be conventionally employed. In case of fast motion in an image, image data can be lost due to excessive crop.

SUMMARY

An aspect of the exemplary embodiments relates to an electronic apparatus for providing an Augmented Reality (AR) function including a motion-stable object by improving an object identification performance from a plurality of consecutive frames, and a controlling method thereof.

According to an embodiment, there is provided an electronic apparatus including a memory, and a processor configured to, obtain a panoramic image by overlapping a partial area of a first image frame stored in the memory with a partial area of at least one second image frame stored in the memory based on pixel information of the first frame and pixel information of the at least one second image frame, identify an area of a predetermined shape of maximum size within the panoramic image, and identify an object from an entire area of the panoramic image or the area in the predetermined shape.

The processor may be further configured to obtain the panoramic image by overlapping an area having a minimum difference between pixel values of adjacent image frames among the first image frame and the at least one second image frame based on the pixel information of the first image frame and the pixel information of the at least one second image frame.

The processor may be further configured to obtain a motion value between adjacent image frames among the first image frame and the at least one second image frame based on the pixel information of the first image frame and the pixel information of the at least one second image frame, and obtain the panoramic image by overlapping the partial area of the first image frame with the partial area of the at least one second image frame based on the motion value.

The processor may be further configured to convert the motion value based on a difference between pixel values in the adjacent image frames and a motion value between the adjacent image frames, and obtain the panoramic image by overlapping the partial area of the first image frame with the partial area of the at least one second image frame based on the converted motion value.

The processor may be further configured to, perform image processing comprising at least one of rotation, position movement, or resizing with respect to each of the first image frame and the at least one second image frame based on the pixel information of the first image frame and the pixel information of the at least one second image frame, and obtain the panoramic image by overlapping a partial area of a frame in which the image processing is performed.

The electronic apparatus may further include a display, wherein the processor is further configured to control the display to display the first image frame, and based on the object identified from the panoramic image, control the display to display the object including at least one of graphical user interface (GUI), character, image, video, or 3D model on an area in which the object is displayed in the first frame in accordance with information on a location at which the object is identified and information on the image processing.

The at least one second frame may be a frame captured before the first frame, wherein the processor is further configured to, based on the panoramic image and pixel information on a third image frame captured after the first image frame, update the panoramic image by overlapping a partial area of the panoramic image with a partial area of the third image frame, identify an area of a predetermined shape of maximum size within the updated panoramic image, and re-identify an object from the updated panoramic image or the area in the predetermined shape within the updated panoramic image.

The third frame may be a frame captured after the first frame, and the processor may be further configured to, based on a ratio between the first image frame with respect to the third image frame and an overlapping area of the third image frame being smaller than a predetermined ratio, re-identify the object from the updated panoramic image, or the area in the predetermined shape within the updated panoramic image.

The processor may be further configured to, based on a plurality of objects being identified in the panoramic image, assign a weighted value to a plurality of respective areas based on at least one of a number of overlapping image frames of a plurality of respective areas of the panoramic image or a capturing time of an image frame in the plurality of respective areas, and identify at least one of the plurality of objects based on a weighted value of the plurality of respective areas.

The electronic apparatus may further include a camera comprising circuitry, wherein the processor is further configured to obtain the plurality of image frames by performing continuous capturing through the camera.

According to an exemplary embodiment, there is provided a method for controlling an electronic apparatus, the method including based on pixel information of a first image frame and pixel information of at least one second image frame among a plurality of frames, obtaining a panoramic image by overlapping a partial area of the first image frame with a partial area of the at least one second image frame, identifying an area of a predetermined shape of maximum size within the panoramic image, and identifying an object from an entire area of the panoramic image or the area in the predetermined shape.

The obtaining may include obtaining the panoramic image by overlapping an area having a minimum difference between pixel values of adjacent image frames among the first image frame and the at least one second image frame based on the pixel information of the first image frame and the pixel information of the at least one second frame.

The obtaining may include obtaining a motion value between adjacent image frames among the first image frame and the at least one second image frame based on the pixel information of the first image frame and the pixel information of the at least one second frame, and obtaining the panoramic image by overlapping the partial area of the first image frame with the partial area of the at least one second image frame based on the motion value.

The obtaining may include converting the motion value based on a difference between pixel values in the adjacent image frames and a motion value between the adjacent image frames, and based on the converted motion value, obtaining the panoramic image by overlapping the partial area of the first image frame with the partial area of the at least one second image frame.

The obtaining may include performing image processing comprising at least one of rotation, positon movement, or resizing with respect to each of the first image frame or the at least one second image frame based on the pixel information of the first image frame and the pixel information of the at least one second image frame, and obtaining the panoramic image by overlapping a partial area of a frame in which the image processing is performed.

The method may further include displaying the first frame, and based on the object identified from the panoramic image, displaying the object including at least one of graphical user interface (GUI), character, image, video, or 3D model on an area in which the object is displayed in the first frame based on information on a location at which the object is identified from the panoramic image and information on the image processing.

The at least one second frame may be a frame captured before the first frame, wherein the method further includes based on the panoramic image and pixel information on a third image frame captured after the first image frame, updating the panoramic image by overlapping a partial image of the panoramic image with a partial area of the third image frame, identifying an area of a predetermined shape of maximum size within the updated panoramic image, and re-identifying an object from an entire area of the updated panoramic image or the area in the predetermined shape within the updated panoramic image.

The third frame may be a frame captured after the first frame, wherein the re-identifying of the object comprises, based on a ratio between the first image frame with respect to the third image frame and an overlapping area of the third image frame being smaller than a predetermined ratio, re-identifying the object from the updated panoramic image, or the area in the predetermined shape within the updated panoramic image.

The identifying of the object may include based on a plurality of objects being identified in the panoramic image, assigning a weighted value to a plurality of respective areas based on at least one of a number of overlapping image frames of a plurality of respective areas of the panoramic image or a capturing time of an image frame in the plurality of respective areas, and identifying at least one of the plurality of objects based on a weighted value of the plurality of respective areas.

The method may further include obtaining the plurality of frames by performing continuous capturing through a camera provided in the electronic apparatus.

According to aspects of the disclosure, an electronic apparatus generates a panoramic image from a plurality of consecutive frames, identifies an object from an area of frames having a smallest motion difference, and improves the accuracy of object identification despite a quick move of a camera, thereby providing Augmented Reality (AR) including a motion-stable object to a user.

DETAILED DESCRIPTION OF EXEMPLARY EMBODIMENTS

Figure 1:
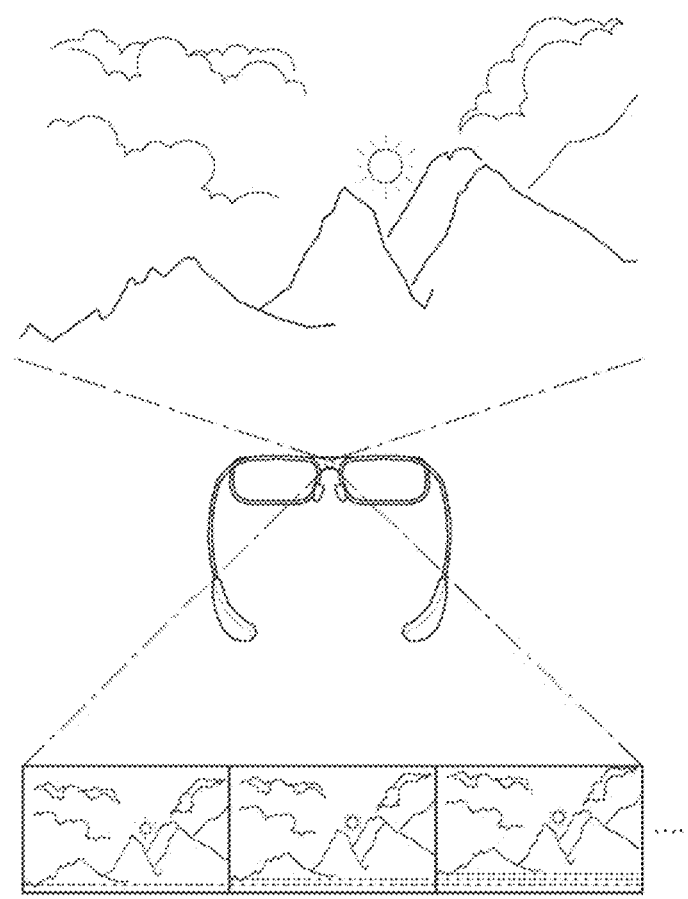
FIG. 1 is a view illustrating a glasses device.

The embodiments of the disclosure may be diversely modified. Accordingly, embodiments are illustrated in the drawings and are described in detail in the detailed description. However, it is to be understood that the disclosure is not limited to a specific embodiment, but includes all modifications, equivalents, and substitutions without departing from the scope and spirit of the disclosure. Also, well-known functions or constructions are not described in detail to avoid obscuring the disclosure with unnecessary detail.

Hereinafter, the disclosure will be described in detail with reference to the accompanying drawings.

All the terms used in this specification including technical and scientific terms have the same meanings as would be generally understood by those skilled in the related art. However, these terms may vary depending on the intentions of the person skilled in the art, legal or technical interpretation, and the emergence of new technologies. In addition, some terms may be selected by the applicant. These terms may be construed in the meaning defined herein and, unless otherwise specified, may be construed on the basis of the entire contents of this specification and common technical knowledge in the art.

The singular expression also includes the plural meaning as long as it does not differently mean in the context. In this specification, terms such as 'include' and 'have/has' should be construed as designating that there are such features, numbers, operations, elements, components or a combination thereof in the specification, not to exclude the existence or possibility of adding one or more of other features, numbers, operations, elements, components or a combination thereof.

In the disclosure, the expressions "A or B," "at least one of A and/or B," or "one or more of A and/or B," and the like include all possible combinations of the listed items.

Terms and labels such as 'first' and 'second' are used to distinguish a component from another without limiting the components.

When an element (e.g., a first constituent element) is referred to as being "operatively (or communicatively) coupled with/to" or "connected to" another element (e.g., a second constituent element), the element is indirectly connected or coupled to the another element or connected or coupled to the another element with one or more intervening elements (e.g., a third constituent element) interposed therebetween. However, when an element (e.g., a first constituent element) is "directly connected" or "directly coupled" to another constituent element (e.g., a second constituent element), there is not another constituent element (e.g., a third constituent element) between an element and another element.

In an embodiment, 'a module,' 'a unit,' or 'a part' perform at least one function or operation, and may be realized as hardware, such as a processor or integrated circuit, software that is executed by a processor, or a combination thereof. In addition, a plurality of 'modules,' a plurality of 'units,' or a plurality of 'parts' may be integrated into at least one module or chip and may be realized as at least one processor except for 'modules,' 'units' or 'parts' that should be realized in a specific hardware.

In this specification, the term "user" may refer to a person who uses an electronic apparatus or an apparatus (e.g., an artificial electronic apparatus) that uses the electronic apparatus.

Hereinafter, the disclosure will be described in detail with reference to the accompanying drawings.

Figure 2A:
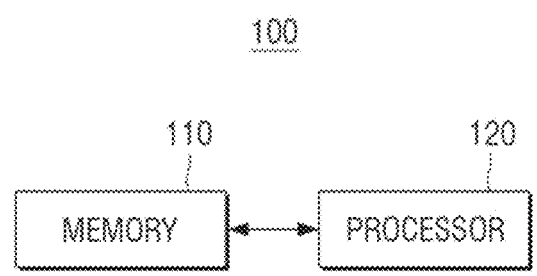
FIG. 2A is a block diagram of an electronic apparatus according to an embodiment.

FIG. 2A is a block diagram of an electronic apparatus 100 according to an embodiment.

Referring to FIG. 2A, an electronic apparatus 100 may include a memory 110 and a processor 120.

The electronic apparatus 100 according to various embodiments may be, for example, an Augmented Reality (AR) glasses apparatus. The AR glasses apparatus may be an apparatus for providing an augmented reality function. Augmented reality may be a technique that allows a user to perceive a virtual object overlaid over a real environment through the glasses apparatus. For example, when a virtual object is overlaid and displayed over a real environment as viewed from a user through the glasses, the user may recognize the virtual object as part of real world. Through the augmented reality, a realistic image could be provided by way of overlaying a virtual object over an actual image viewed from a user because an actual environment and a virtual screen cannot be clearly distinguished.

The electronic apparatus 100 according to various embodiments of the disclosure may be a smartphone, a tablet personal computer (a table PC), a mobile phone, a video phone, an e-book reader, a laptop personal computer (a laptop PC), a netbook computer, a personal digital assistant (PDA), a portable multimedia player (PMP), an MP3 player, a mobile medical device, a camera, or a wearable device, or they may be part of them. A wearable device may be an accessory type device such as a watch, a ring, a bracelet, a bracelet, a necklace, a pair of glasses, a contact lens or a head-mounted-device (HMD), a fabric or a garment-all-in-one type (e.g., electronic outfit), a body attachment type (e.g., a skin pad or a tattoo), or a bio-implantable circuit.

In some embodiments, examples of the electronic apparatus may be home appliances. The home appliances may include, at least one of, for example, a television, a digital video disk (DVD) player, an audio, a refrigerator, an air conditioner, a vacuum cleaner, an oven, a microwave oven, a washing machine, a set-top box, a home automation control panel, a security control panel, a TV box (e.g., Samsung HomeSync™, Apple TV™, or Google TV™) a game console (e.g., Xbox™, and PlayStation™), an electronic dictionary, an electronic key, a camcorder, or an electronic frame.

In another embodiment, the electronic apparatus may be any of a variety of medical devices (e.g., various portable medical measurement devices such as a blood glucose meter, a heart rate meter, a blood pressure meter or a body temperature meter), a magnetic resonance angiography (MRA), a magnetic resonance imaging (MRI), a computed tomography (CT), a camera, an ultrasonic device, a navigation device, a global navigation satellite system (GNSS), an event data recorder (EDR), a flight data recorder (FDR), an automobile infotainment device (e.g., navigation devices, gyro compasses, etc.), avionics, security devices, head units for vehicles, industrial or home robots, ATMs (automatic teller's machine) of financial institutions, point of sale (POS) of a store, or Internet of Things (IoT) such as a light bulb, various sensors, an electric or gas meter, a sprinkler device, a fire alarm, a thermostat, a street lamp, a toaster, an exercise device, a hot water tank, a heater, boiler, etc.

The electronic apparatus 100 could be any object that identifies an object in a plurality of image frames.

The memory 110 may store a plurality of image frames. The plurality of image frames may be a plurality of frames captured by a camera provided in the electronic apparatus 100. When the electronic apparatus 100 is an AR glasses apparatus, image blur may occur due to movement of the AR glasses caused by motion of the user while the frames are captured.

The plurality of frames may be images of one scene. For example, the plurality of frames may be images of an intersection. However, the intersection in the plurality of frames may be captured within the frames at different positions due to the user's movement. For example, in the first frame, the center of the intersection may be the center of the frame. However, in the second frame, the center of the intersection may not be the center of the frame.

The disclosure is not limited thereto, but a plurality of frames may be images of a plurality of scenes. The processor 120 may separate the plurality of frames into a plurality of groups based on a plurality of respective scenes. Each of the plurality of groups may be one scene.

However, the disclosure is not limited thereto. The electronic apparatus 100 may receive a plurality of frames captured by an external device, and the memory 110 may store the plurality of received frames.

The memory 110 may be embodied as a hard disk, a non-volatile memory, and a volatile memory, and any type of memory that stores data.

The processor 120 may control the overall operations of the electronic apparatus 100.

According to an embodiment, the processor 120 may be implemented as a digital signal processor (DSP), a microprocessor, or a time controller (TCON), but is not limited thereto. The processor 120 may include one or more central processing unit (CPU), a microcontroller unit (MCU), a micro processing unit (MPU), a controller, an application processor (AP), or a communication processor (CP), an ARM processor, and the like, or may be defined by the corresponding terms. The processor 120 may be implemented as a system on chip (SoC), a large scale integration (LSI) with a built-in processing algorithm, or in the form of a field programmable gate array (FPGA). The processor 120 may perform various functions by executing computer executable instructions stored in and loaded from the memory 120.

The processor 120 may obtain a panoramic image by overlapping a partial area of a first frame with a partial area of at least one second frame based on pixel information on the first frame and the at least one second frame among a plurality of frames stored in the memory 110.

For example, the processor 120 may obtain a panoramic mage by overlapping the partial area of the first frame with the partial area of the second frame based on the pixel information of the first frame and the pixel information of the second frame among the plurality of frames stored in the memory 110. To be specific, each of the first frame and the second frame may be an image of a resolution 1920×1080, and if a pixel value of a first square area from a pixel (21, 1) of the first frame to a pixel (1920, 1080) coincides with a pixel value of a second square area from a pixel (1, 1) of the first frame to a pixel (1900, 1080), the processor 120 may obtain a panoramic image so that the first square area of the first frame overlaps with the second square area of the second frame. This is because, although the difference between the shooting time of the first frame and the shooting time of the second frame in the actual shooting process is very small, the shooting angle can be changed by the influence of the user's motion.

For ease of explanation, the embodiment describes that two frames are overlapped with each other, but the processor 120 may obtain a panoramic image by overlapping three or more images.

The processor 120 may obtain a panoramic image by overlapping an area having a minimum difference in pixel values between adjacent frames based on pixel information of each of the first frame and the second frame. In the case of more than two frames, pixel information of every frame may be considered. This is because a pixel value could be changed due to a change in the light amount despite a very small difference between the capturing points of the first frame and the second frame during the actual shooting process. For example, in the above-described example, pixel values of the first square area of the first frame and the second square area of the second frame may not coincide with each other. Therefore, the processor 120 may obtain an area having a minimum difference in pixel values between overlapping areas by moving the first frame over the second frame on a pixel-by-pixel basis, and obtain a panoramic image by overlapping the first frame with the second frame so that the difference in pixel values is minimized.

The processor 120 may obtain a motion value between adjacent frames based on pixel information of each of the first frame and the second frame (and additional frames if more than two frames are employed), and obtain a panoramic image by overlapping the partial area of the first frame with the partial area of the second frame based on the obtained motion value. In the above-described example, the processor 120 may obtain a motion value (20, 0) between the first frame and the second frame based on the pixel information on the first frame and the second frame. The processor 120 may obtain a panoramic image by overlapping the first frame with the second frame based on the motion value.

However, the disclosure is not limited thereto, and the motion value may be a value obtained as the frames are captured. For example, the electronic apparatus 100 may further include a camera comprising circuitry, and the processor 120 may obtain a plurality of frames by taking a continuous capturing through the camera. The processor 120 may sense a motion of the electronic apparatus 100 through a sensor based on respective capturing times of the plurality of respective frames. The processor 120 may obtain a motion value between adjacent frames based on the sensed motion of the electronic apparatus 100.

The processor 120 may convert a motion value obtained based on a difference between pixel values in adjacent frames and a motion value (motion vector) between the adjacent frames, and overlap the partial area of the first frame with the partial area of the at least one second frame based on the converted motion value to obtain a panoramic image. For example, the processor 120 may stabilize motion values between adjacent frames of a plurality of consecutive frames and convert the motion values. A deviation between adjacent motion values may be reduced by converting the motion value.

The processor 120 may stabilize motion values based on pixel values of adjacent frames. The processor 120 may stabilize each motion value based on a motion stabilization model. The motion stabilization module may be a model obtained by training through an artificial algorithm to stabilize a motion value based on a difference between pixel values in adjacent frames. The processor 120 may perform a stabilization operation for each motion value and reduce a deviation between adjacent motion values. By doing so, image blur that occurs in reproducing a plurality of frames may be reduced by minimizing the deviation between adjacent motion values.

A method for obtaining a panoramic image using the converted motion value may be the same as a method for obtaining a panoramic image using a motion value before conversion. Therefore, the detailed description thereof will be omitted.

The processor 120 may identify an area in a predetermined shape of maximum size in a panoramic image. The maximum size may correspond to a maximum size of the predetermined shape inscribed within the overlapping images of the panoramic image. For example, the processor 120 may identify a square area of maximum size having the aspect same ratio as a plurality of frames in the panoramic image. However, the disclosure is not limited thereto. The predetermined shape may be various such as a diagonal shape, a circular shape, etc. For ease of explanation, a square area will be an example of an area in a predetermined shape.

The processor 120 may identify an object from an entire panoramic image or an area in a predetermined shape. For example, the processor 120 may identify an object from a panoramic image, and identify an area in a predetermined shape of the identified area as a final identified area.

The processor 120 may perform at least one of image processing such as rotation, position movement, and resizing with respect to each of the first frame and at least one second frame based on pixel information on the first frame and the at least one second frame, and obtain a panoramic image by overlapping a partial area of the frame on which image processing is performed.

The electronic apparatus 100 may further include a display, and the processor 120 may control the display to display the first frame thereon, and when an object is identified from a panoramic image, may control the display to display thereon an object including at least one of graphical user interface (GUI), character, image, video or 3D model on an area at which the object is displayed in the first frame based on information on the location at which the object is identified from the panoramic image and image processing information. The processor 120 may perform object identification within the panoramic image, and display an object on the identified area of the displaying frame. The object may be virtual 2D/3D contents.

At least one second frame may be a frame that is captured before the first frame. The processor 120 may update a panoramic image by overlapping a partial area of the panoramic image with a partial area of a third frame based on the panoramic image and pixel information on the third frame captured after the first frame, identify an area in a determined shape of maximum size within the updated panoramic image, and again identify an object in the updated panoramic image, or in the area in the predetermined shape within the updated panoramic image.

In other words, the processor 120 may generate a panoramic image based on each of a plurality of frames, and thus generate panoramic images in corresponding quantity to the plurality of frames. The processor 120 may overlap a panoramic image corresponding to a frame immediately preceding the present frame with the present frame to generate a panoramic image corresponding to the present frame. That is, the processor 120 may obtain a panoramic image by updating a panoramic image according to the change of the present frame. When a panoramic image is updated, the processor 120 may remove the oldest frame from the panoramic image.

The third frame may be a frame that is captured immediately succeeding the first frame, and the processor 120, if a ratio between the first frame with respect to the third frame and an overlapping area of the third frame is smaller than a predetermined ratio, may obtain an image with respect to a new scene that cannot be derived from the first and second frames. Therefore, an object can be again identified within the panoramic image updated for recognizing a new object or within the area in the predetermined shaped of the updated panoramic image. The processor 120, if a ratio between the first frame with respect to the third frame and the overlapping area of the third frame is equal to or greater than a predetermined ratio, may obtain an image of a scene similar to the first frame, and may not again identify an object in the updated panoramic image because the scene has not substantively changed. In this case, the processor 120 may utilize object information identified from the panoramic image before updating, that is without further updating. Therefore, the power consumption of the electronic apparatus 100 may be reduced compared to a conventional method for identifying an object every time an input image is provided by way of reducing the number of object identification operations based on the motion of the image captured by a camera.

The processor 120, when a plurality of objects are identified from a panoramic image, may assign a weighed value to each of the plurality of areas based on at least one of a identification confidence value obtained as an object identification result, the number of overlapping frames of each of the plurality of areas in the panoramic image, or the capturing time of the frame in each of the plurality of areas, and identify at least one of the plurality of objects based on the weighted value assigned to each of the plurality of areas.

For example, the processor 120, when a plurality of objected are identified from a panoramic image, may identify the number of overlapping frames at the position of each of the plurality of objects, and identify an object identified in the area having the largest number of overlapping frames as a final object. The processor 120, when a plurality of objects are identified from the panoramic image, may identify a capturing time of the overlapped frame at the position of each of the plurality of objects, assign a weighted value to each of the plurality of objects by way of assigning a highest weighted to a lastly captured frame, and identify the object assigned the highest weighted value as a final object.

Such method for identifying an object may reduce errors that occur in object identification by filtering an object identification result obtained from the oldest frame. For example, if a passing car is present in the first frame, and no car is present in the third frame that is obtained after the first frame, among the results of the object identification obtained from the panoramic image including the first frame, the third frame, and the subsequently obtained frames, a car that is not present at the present time can be excluded from the final object identification result.

Figure 2B:
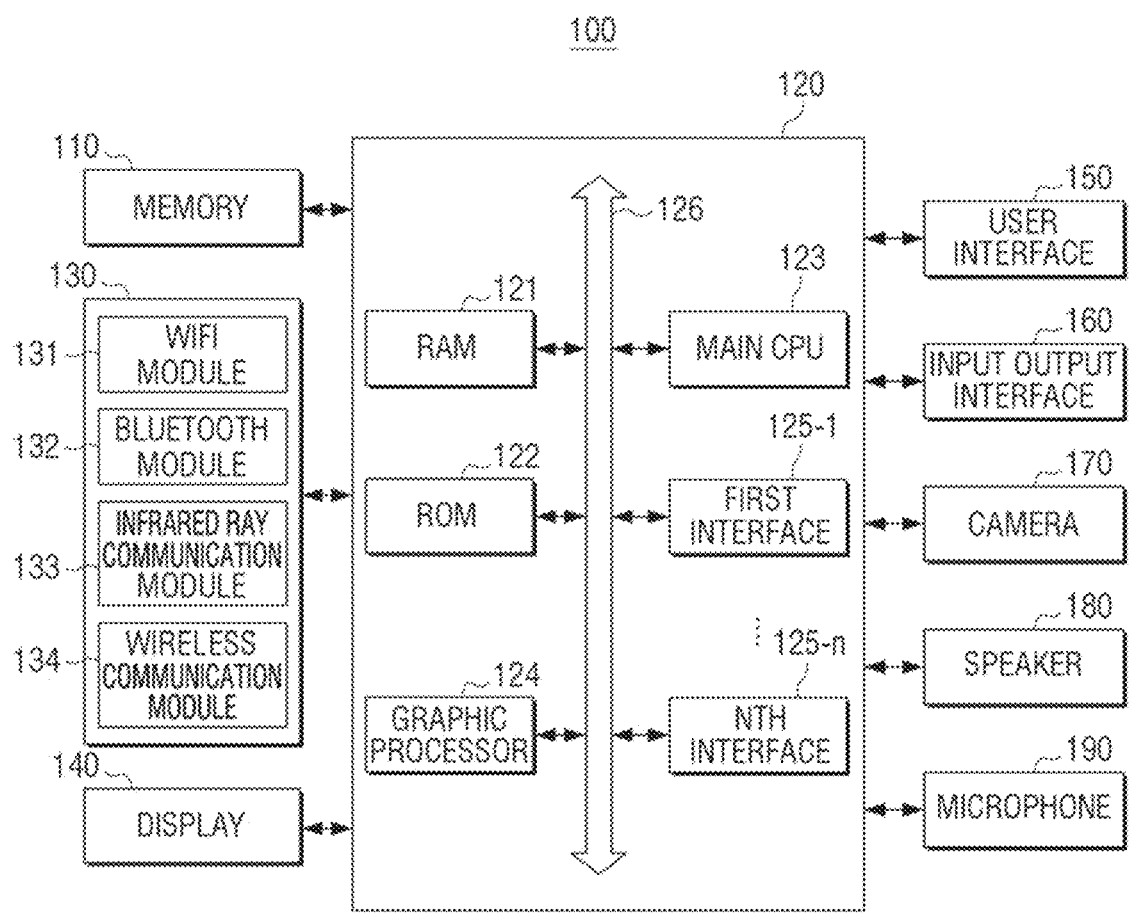
FIG. 2B is a block diagram of an electronic apparatus according to an embodiment.

FIG. 2B is a detailed block of an electronic apparatus 100. The electronic apparatus 100 may include a memory 110 and a processor 120. Referring to FIG. 2B, the electronic apparatus 100 may include a communication interface 130, a display 140, a user interface 150, an input/output interface 160, a camera 170, a speaker 180, and a microphone 190.

The memory 110 may be implemented as an internal memory such as a ROM (for example, electrically erasable programmable read-only memory (EEPROM)), a RAM, or memory separate from the processor 120. In this case, the memory 110 may be implemented in the form of a memory embedded in the electronic apparatus 100, or a removable memory in the electronic apparatus 100, depending on the purpose of data storage. For example, data for driving the electronic apparatus 100 may be stored in a memory embedded in the electronic apparatus 100, and data for an expansion function of the electronic apparatus 100 may be stored in a memory attachable to or detachable from the electronic apparatus 100. The memory embedded in the electronic apparatus 100 may be embodied with at least one of a volatile memory (e.g., dynamic RAM, (DRAM), or static RAM (SRAM), synchronous dynamic RAM (SDRAM), or the like), a non-volatile memory (e.g., one time programmable ROM (OTPROM), programmable ROM (PROM), erasable and programmable ROM (EPROM), electrically erasable and programmable ROM (EEPROM), mask ROM, flash ROM, flash memory (such as NAND flash or NOR flash), a hard drive, or a solid state drive (SSD). The memory removable from the electronic apparatus 100 may be embodied with a memory card (e.g., a compact flash, a secure digital (SD), a micro secure digital (SD), a mini secure digital (SD), an extreme digital (xD), or the like), an external memory connectable to a USB port (e.g., a USB memory), or the like.

The memory 110 may store various data such as operating system (O/S) software module for implementing functions of the electronic apparatus 100, a motion stabilization module, a panoramic image generation module, an object identification module, etc.

The processor 120 may control the overall operation of the electronic apparatus 100 by executing various programs stored in and loaded from the memory 110.

The processor 120 may include a RAM 121, a ROM 122, a main CPU 123, a graphic processor or graphic processing unit (GPU) 124, first to nth interface 125-1 to 125-n, and a bus 126.

The RAM 121, the ROM 122, the main CPU 123, GPU 124, and the first to nth interface 125-1 to 125-n may be connected through the bus 126.

The ROM 122 may store a command set, etc. for system booting. If a power-on command is input and power is supplied, the CPU 123 may copy the operation system stored in the storage 180 to the RAM 121 according to the command stored in the ROM 122, execute the operation system and perform booting of the system. When the booting is completed, the CPU 123 may copy various programs stored in the storage 180 to the RAM 121, execute the application program copied to the RAM 121 and perform various operations.

The main CPU 123 may access the memory 110, and perform booting by using the O/S stored in the memory 110. The main CPU 123 may perform various operations by using various programs, contents data, etc. stored in the memory 110.

The first to nth interface 125-1 to 125-n may be connected to the various constituent elements as described above. One of the interfaces may be a network interface connected to an external apparatus through a network.

The processor 120 and/or the GPU 124 may perform a graphic processing (video processing). The processor 120 and/or the GPU 124 may generate a screen including various objects such as icons, images, texts, etc. by using a calculation unit and a rendering unit. The calculation unit may calculate attribute values such as coordinate values, shapes, sizes, colors, etc. of the objects according to the layout of the screen by using the received control command. The rendering unit may generate screens of various layouts including objects based on the attribute values calculated by the calculation unit. The screen generated by the rendering unit may be displayed in a display region of the display 140. The processor 120 and/or the GPU 124 may perform various processing on video data such as decoding, amplification, noise filtering, etc.

The processor 120 may be configured to perform processing of audio data. The processor 120 may perform various image processes such as decoding, scaling, noise filtering, frame rate conversion, resolution conversion, etc. of audio data.

The communication interface 130 may perform communication with various types of external devices according to various types of communication methods. The communication interface 130 includes a Wi-Fi module 131, a Bluetooth module 132, an infrared communication module 133, a wireless communication module 134, and the like. Each communication module may be implemented in the form of at least one hardware chip.

The processor 120 may communicate with various external devices using a communication interface 130. The external device may be a display device such as a TV, a video processing device such as a set-top box, an external server, a control device such as a remote controller, an audio output device such as a Bluetooth speaker, a lighting device, home appliances such as a smart cleaner and a smart refrigerator, a server such as an IOT home manager, and the like.

The Wi-Fi chip 131 or a Bluetooth chip 132 may perform communication using a Wi-Fi method, and a Bluetooth method, respectively. When the Wi-Fi chip 131 or the Bluetooth chip 132 is used, various connectivity information such as an SSID and a session key may be transmitted and received first, communication connection may be established based on the connectivity information, and various information may be transmitted and received based thereon.

The infrared communication module 133 may perform communication according to an infrared data association (IrDA) technology for transmitting data wirelessly at a short distance using an infrared ray between a time ray and a millimeter wave.

The wireless communication module 134 may include at least one communication chip for forming communication according to various communication standards such as IEEE, ZigBee, 3rd Generation (3G), 3rd Generation Partnership Project (3GPP), Long Term Evolution (LTE), $4^{th}$ Generation (4G), $5^{TH}$ Generation (5G), or the like.

In addition, the communication interface 130 may include at least one of a LAN (Local Area Network) module, an Ethernet module, or a wired communication module that performs communication using a pair cable, a coaxial cable, or an optical fiber cable.

According to one example, the communication interface 130 may use the same communication module (e.g., a Wi-Fi module) to communicate with external devices such as a remote controller and an external server.

According to another example, the communication interface 130 may use a different communication module (e.g., a Wi-Fi module) to communicate with an external device such as a remote controller and an external server. For example, the communication interface 130 may use at least one of an Ethernet module or a WiFi module to communicate with an external server, and may use a Bluetooth module to communicate with an external device such as a remote controller. However, this is only an example, and the communication interface 130 may use at least one communication module among various communication modules when communicating with a plurality of external devices or an external server.

Meanwhile, the electronic apparatus 100 may further include a tuner and a demodulator according to an embodiment.

The tuner may receive a RF broadcast signal by tuning a channel selected by a user or all pre-stored channels among Radio Frequency (RF) broadcast signals received through an antenna.

The demodulation unit may receive and demodulate a digital IF signal DIF converted by the tuner and perform channel decoding.

The display 140 may be implemented as various types of displays such as a Liquid Crystal Display (LCD), an Organic Light Emitting Diodes (OLED) display, a Plasma Display Panel (PDP), and the like. The display 140 may also include a driving circuit, a backlight unit, etc., which may be implemented in the form of an a-si TFT, a low temperature poly silicon (LTPS) TFT, an organic TFT (OTFT), etc. Meanwhile, the display 140 may be implemented as a touch screen in combination with a touch sensor, a flexible display, a three dimensional display (3D display), etc.

In addition, according to an embodiment, the display 140 may include a display panel for outputting an image, as well as a bezel housing the display panel. In particular, according to an embodiment, the bezel may include a touch sensor for sensing a user interaction.

The user interface 150 may be implemented as a device such as a button, a touch pad, a mouse, and a keyboard, or a touch screen capable of performing the above-described display function and operation input function. The button may be various types of buttons such as a mechanical button, a touch pad, a whirl, etc. provided in a random area such as a front surface unit, a side surface unit, and a rear surface unit of the outside of the body of the electronic apparatus 100.

The input/output interface 160 may be an interface of any one of a high-definition multimedia interface (HDMI), a mobile high-definition link (MHL), a universal serial bus (USB), a display port (DP), a thunderbolt, a Video Graphics Array (VGA) port, an RGB port, a D-subminiature (D-SUB), and a digital visual interface (DVI). The input/output interface 160 may also be used to communicate with external devices, in addition to the communication interface 130.

The input/out interface 160 may input and output at least one of an audio signal and a video signal.

According to an example embodiment, the input/output interface 160 may separately include a port for inputting and outputting only an audio signal, and a port for inputting and outputting only a video signal, and may be embodied a single port for inputting and outputting both an audio signal and a video signal.

The electronic apparatus 100 may be embodied an apparatus without a display to transmit an image signal to a separate display apparatus.

The camera 170 may be configured to capture a still image or a video image under the user's control. The camera may capture a still image at a specific point, or continuously capture a still image.

The speaker 180 may be configured to output various alarming sounds or voice messages in addition to various audio data processed by the input/output interface 160.

The microphone 190 may be configured to receive user voice and other sounds and convert the user voice and other sounds into audio data.

The microphone 190 may receive a user voice in an activated state. For example, the microphone 190 may be integrally formed with the electronic apparatus 100 upwardly, forwardly, or sideway. The microphone 190 may include a microphone for collecting user's voice in analog form, an amplifier circuit for amplifying the collected user's voice, an audio-to-digital (A/D) conversion circuit for sampling the amplified user's voice and converting the sampled user's voice into a digital signal, a filter circuit that removes noise components from the converted digital signal, or the like.

The electronic apparatus 100 may receive a user voice signal from an external apparatus including a microphone. The received user voice signal may be a digital voice signal, but may be an analog voice signal. For example, the electronic apparatus 100 may receive a user voice signal through a wireless communication method such as Bluetooth, Wi-Fi, etc. The external apparatus may be embodied as a remote control device or a smartphone.

The electronic apparatus 100 may transmit a voice signal to an external server for voice recognition of a voice signal received from an external apparatus.

A communication module for communication with an external apparatus or an external server may be embodied as one or more modules. For example, the electronic apparatus may perform communication with by using a Bluetooth module, and perform communication with an external server by using an Ethernet modem or Wi-Fi module.

The electronic apparatus 100 may receive a voice and convert the voice into a sentence. For example, the electronic apparatus 100 may directly apply a Speech To Text (STT) to a digital voice signal received through the microphone 190 and convert the digital voice signal into text information.

The electronic apparatus 100 may transmit the digital voice signal received through the voice recognition server. The voice recognition server may convert a digital voice signal into text information by using the Speech To Text (STT). The voice recognition server may transmit text information to another server or an electronic apparatus for performing research corresponding to the text information. In some cases, the electronic apparatus 100 may directly perform search for information corresponding to the text information.

Figure 2C:
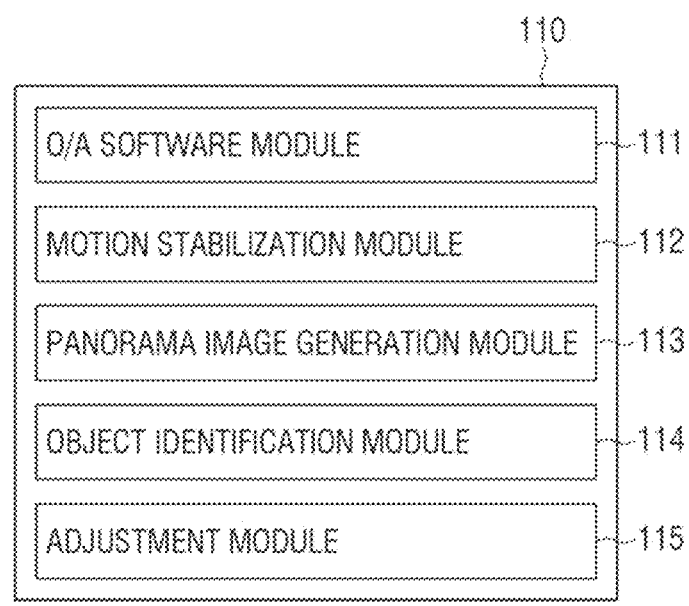
FIG. 2C is a block diagram of a plurality of modules of an electronic apparatus according to an embodiment.

FIG. 2C is a block diagram of a plurality of modules of the electronic apparatus 100. The memory 110 may store an O/S software module 111, a motion stabilization module 112, a panorama image generation module 113, an object identification module 114, and an adjustment module 115.

The O/S software module 111 may be a module for controlling overall operations of the electronic apparatus 100. For example, the O/S software module 111 may be used to turn on or turn off the electronic apparatus 100, and may include operational information such as memory managing in a standby state.

The motion stabilization module 112 may be a module for stabilizing a motion value between a plurality of frames. The motion stabilization module 112 may stabilize a motion value between the plurality of frames, and remove image blur in replaying a video for image processing.

The panorama image generation module 113 may be a module for generating a panorama image by overlapping a plurality of frames having a stable motion value through the motion stabilization module 112. The panorama image generation module 113, when a present frame is changed, may update an existing panorama image. The panorama image generation module 113 may remove the oldest frame from the panorama image, and overlap a new frame with the panorama image.

The object identification module 114 may be a module for identifying an object from the panorama image generated through the panorama image generation module 113. The object identification module 114 may identify an object from an entire panorama image, or after determining an area of a predetermined shape within a panorama image, identify an object from the area in the predetermined shape. The object identification module 114, if a meaningful object is not identified after an object is identified in the area of the predetermined shape, may identify an object from the entire panoramic image. The meaningful object may be an object identified by the object identification module 114. The meaningful object may be an object set by a user.

The adjustment module 115 may be a module for identifying a location of a display of a GUI that indicates an object. A frame captured by a camera 170 could be different from an image viewed by a user through an AR glasses. When an angle of the view of the camera 170 is large, the frame captured by the camera 170 may include an area larger than an area of the image viewed through the AR glasses of the user. The adjustment module 115 may calculate a location to be displayed on the display 140 of the AR glasses to indicate an object of an image viewed from the GUI indicating an object by a user. For example, the adjustment module 115 may obtain a display location of the GUI indicating an object by using a predetermined ratio between a frame captured according to an angle of the view and an image viewed through the AR glasses of the user.

As described above, the processor 120 may generate a panoramic image from the consecutive plurality of frames, and identify an object from the generated panoramic image.

Hereinafter, the operation of the electronic apparatus 100 will be described in detail with reference to the drawings.

Figure 3:
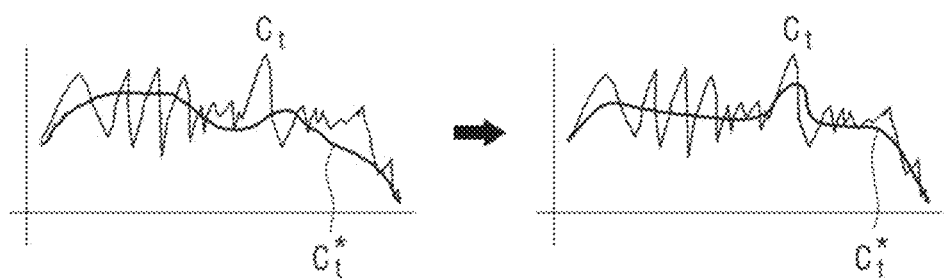
FIG. 3 is a view to explain motion stabilization according to an embodiment.

FIG. 3 is a view to explain motion stabilization according to an embodiment of the disclosure. Referring to FIG. 3, Ct may indicate motion values, and Ct* may indicate the converted motion values.

The plurality of motion values may be converted to reduce a deviation between motion values of adjacent frames of the plurality of frames. For example, referring to Ct shown on the left side of FIG. 3, if a function indicating motion values is low-pass filtered, motion values may be converted, as shown at Ct* on the left side of FIG. 3. Image blur may be reduced when the plurality of frames having the changed motion value is reproduced rather than when the plurality of frames before changing the motion value are reproduced.

However, referring to FIG. 3, a result of converting a motion value according to a conventional technique which does not reflect the characteristic of each frame is shown on the left side. Motion values may be converted based on a first function indicating the adjustment degree of the overlapped area and a second function with respect to a motion value. In a conventional technique, the first function and the second function have been applied to all the motion values in the same manner.

FIG. 3 illustrates the processor 120 stabilizes each motion value based on a motion stabilization model on its left side. The motion stabilization model may be a module trained and obtained through an artificial algorithm to stabilize a motion value based on a difference in pixel values between adjacent frames. When using a motion stabilization model, the first function and the second function may be identified by reflecting the characteristic of each frame. Different functions may be applied to each of the motion values. The different functions mean that parameters of the functions are different.

When image change is severe, the improved stabilization function than a conventional case may be represented. For example, if there is a section having a severe image blur and a section having no image blur among the plurality of frames, according to a convention technique, such feature is not reflected, and stabilization may be performed based on one function. Accordingly, the section having severe image blur may be less shaky, but the section having no image blur may be shaky. In this regard, when using a motion stabilization model, stabilization may be performed based on the function generated with respect to each of motion values. Accordingly, the section having the severe image blur may be less shaky, and the section having no image blur may maintain a state without shaking.

Figure 4A:
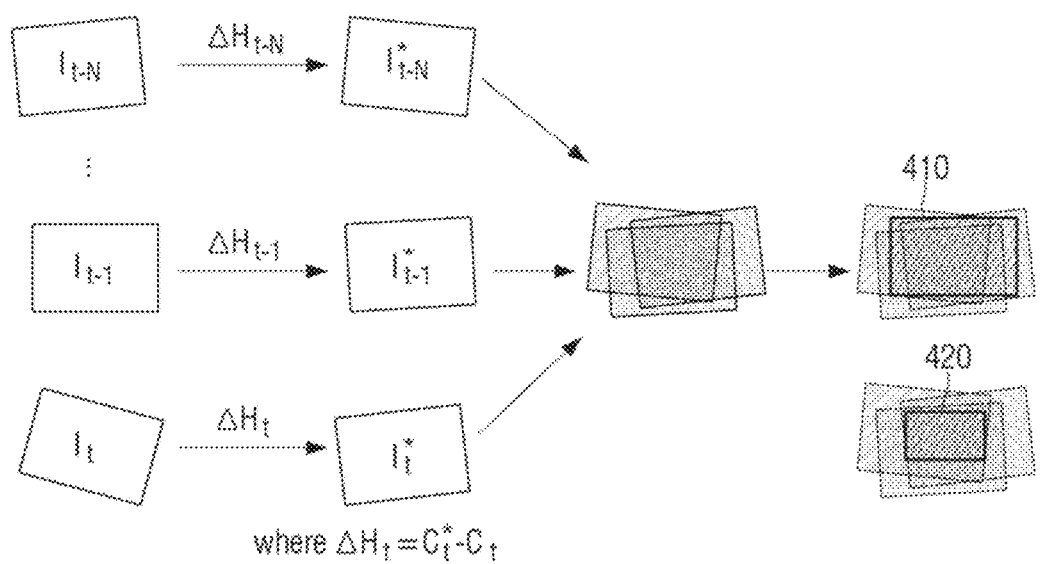
FIG. 4A is a view to explain a method for generating a panoramic image according to an embodiment.
Figure 4B:
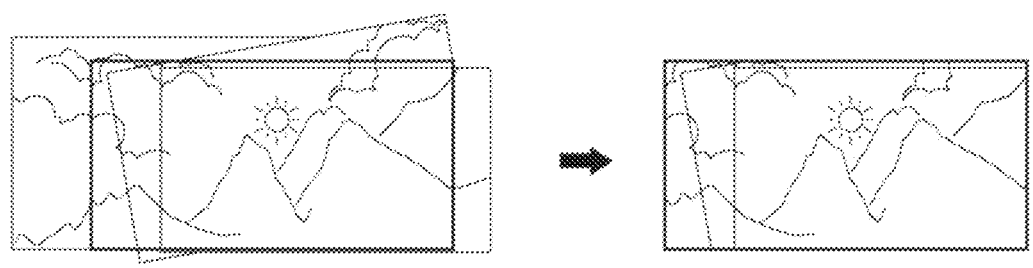
FIG. 4B is a view to explain a method for generating a panoramic image according to an embodiment.

FIG. 4A and FIG. 4B are views to explain a method for generating a panoramic image according to an embodiment of the disclosure.

The processor 120 may obtain a panoramic image by overlapping the partial area of the first frame with the partial area of the at least one second frame based on pixel information on each of the first frame and the at least one second frame among a plurality of frames. For example, the processor 120, as shown in FIG. 4A, may obtain a panoramic image by using the first frame and N second frames. The processor 120 may obtain a panoramic image by overlapping N+1 frames. The first frame may be a present frame, and the second frame may be a frame captured before the first frame. The first frame and the N second frames may be consecutive frames.

The processor 120 may obtain transfer function ΔHt based on converted motion value Ct* and motion value Ct, and overlap the first frame with N second frames based on the transfer function.

The processor 120 may identify a square area 410 of maximum size in the panoramic image. Conventionally, a resolution may be reduced because the overlapped square area 420 is used in the entire area of the plurality of frames. However, according to the disclosure, a panoramic image may be generated, and a resolution may be increased beyond resolution of a conventional technique because the square area 410 of maximum size is used in the panoramic image. In addition, a resolution of the square area 410 may be higher than a resolution of the frame.

Referring to FIG. 4B, the processor 120 may convert the first frame into the square area 410.

Figure 5A:
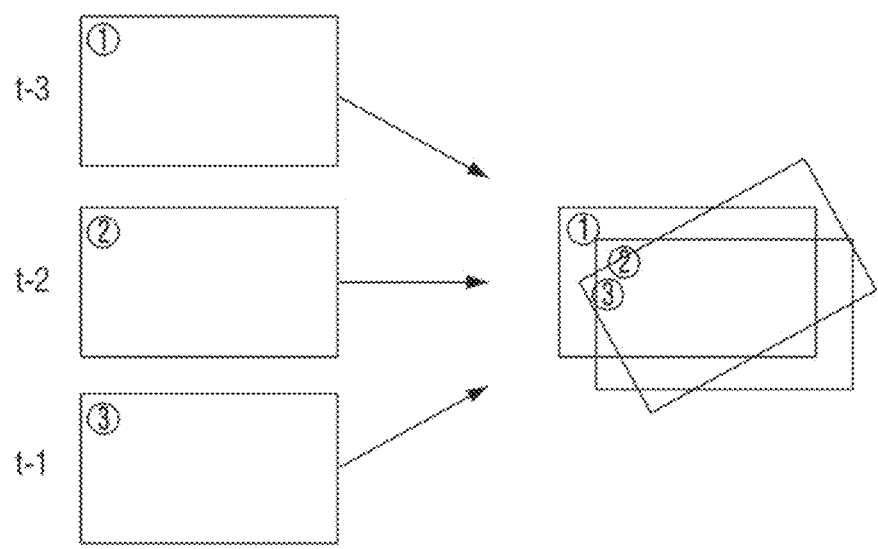
FIG. 5A is a view to explain a method for generating a panoramic image for each reference frame according to an embodiment.
Figure 5B:
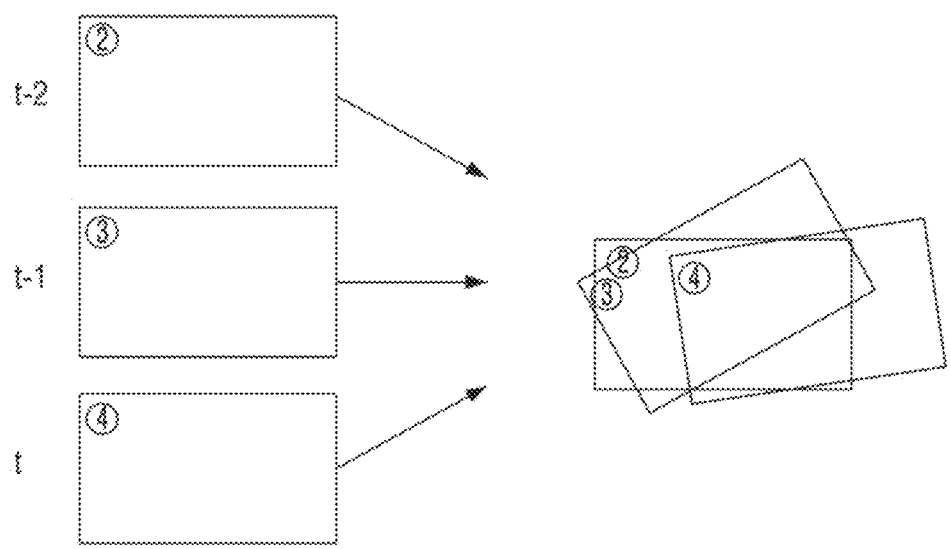
FIG. 5B is a view to explain a method for generating a panoramic image for each reference frame according to an embodiment.

FIG. 5A and FIG. 5B are views to explain a method for generating a panoramic image for each reference frame according to an embodiment. Referring to FIGS. 5A and 5B, for ease of explanation, a panoramic image is obtained by using the first frame and two second frames.

Referring to FIG. 5A, the processor 120 may obtain a first panoramic image by using a first frame (frame t-1) and two second frames (frames t-2 and t-3). T-1, t-2, t-3 may be only for explaining the order of the frames, and do not have a temporal meaning. That is, FIG. 5A is a view to explain generating of A first panoramic image for converting the first frame (frame t-1).

The processor 120 may obtain a first panoramic image by overlapping the first frame with two second frames based on the pixel information on the first frame and two second frames. The processor 120 may replace the first frame (frame t-1) with a square area of maximum size in the first panoramic image.

Referring to FIG. 5B, the processor 120 may obtain a second panoramic image using a first frame (frame t) and two second frames (frames t-1 and t-2). The processor 120 may overlap frames by analyzing three frames, as well as using the first panoramic image.

The processor 120 may remove the non-overlapped part of frame t-3 from the first panoramic image, and overlap the frame t to obtain the second panoramic image. Through such method, a panoramic image may be generated in real time.

The processor 120 may replace the first frame (frame t) with a square area of maximum size in the second panoramic image.

The processor 120 may minimize image blur by repeating the same task with respect to a plurality of frames.

Figure 6:
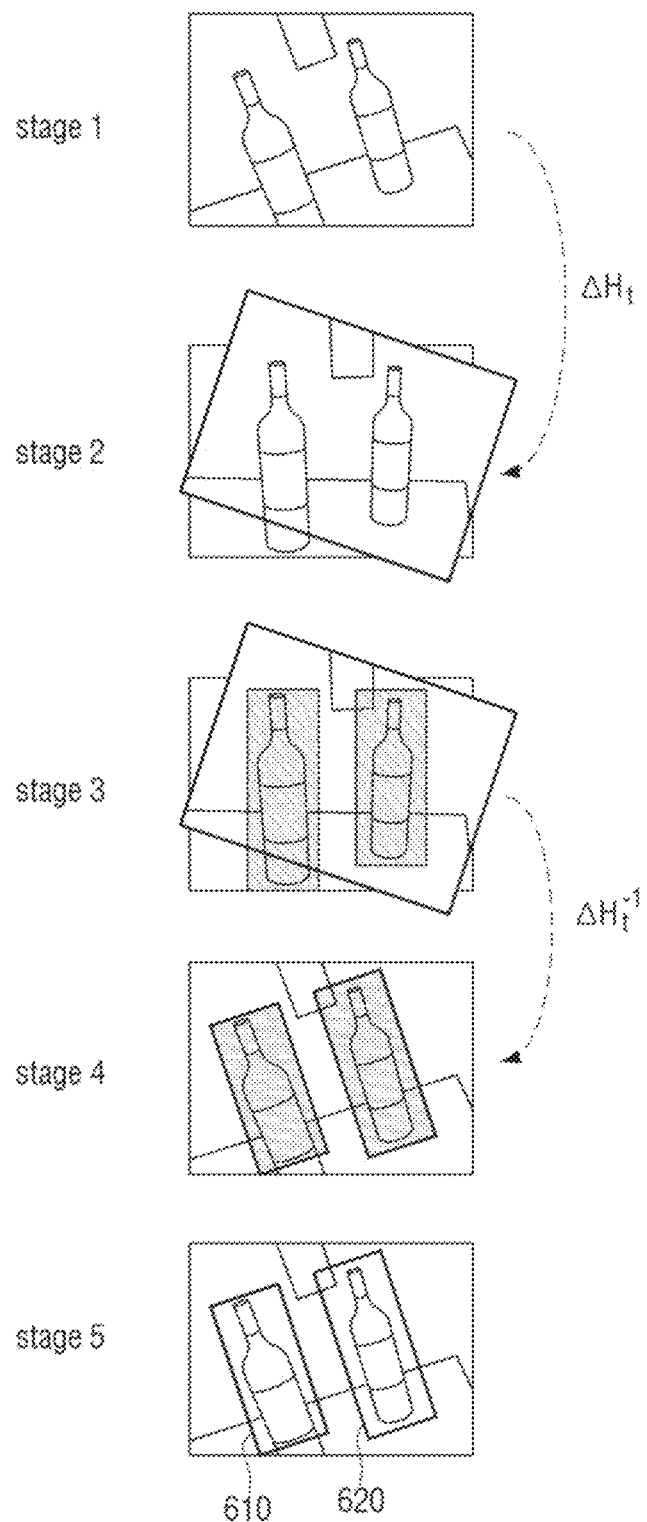
FIG. 6 is a view to explain a method for identifying an object and displaying an object identification result according to an embodiment.

FIG. 6 is a view to explain a method for identifying an object and displaying an object identification result according to an embodiment.

Referring to FIG. 6, stages 1 and 5 show an image displayed through the display 140 of the electronic apparatus 100. For example, when the electronic apparatus 100 is an AR glasses apparatus, the processor 120 may control the camera 170 and capture frames as shown in stages 1 and 5, and control the display 140 to display the captured frames. The processor 120 may control the display 140 to display the frames at stages 1 and 5 while performing operations at stages 2 to 4.

The processor 120 may perform image processing on the frame at stage 1, and additionally overlap the image processed frame with a previous panoramic image to generate a panoramic image at stage 2. For example, the processor 120 may rotate the frame at stage 1 in a clockwise direction by 30 degrees to additionally overlap the frame with a previous panoramic image.

The processor 120 may identify an object from the panoramic image at stage 3. The processor 120 may convert information on a location at which an object is identified from the panoramic image based on image processing information with respect to the frame at stage 1. For example, the processor 120 may rotate the information on the location at which the object is identified from the panoramic image in a counter-clock wise direction by 30 degrees as the frame at stage 4. The processor 120 may convert only the information on the location at which the object is identified from the panoramic image based on the image processing information, but convert the information on the location at which the object is identified from the panoramic image based on image processing information together with the image processed frame at stage 1.

The processor 120 may control the display 140 to display graphical user interfaces (GUIs) 610, 620 in the area of the object displayed of the frame at stage 1, such as the frame at stage 5.

As described above, the object recognition performance can be improved by using a panoramic image. Particularly, even if the user moves, the object recognition performance can be improved through matching with the previous frame.

Figure 7A:
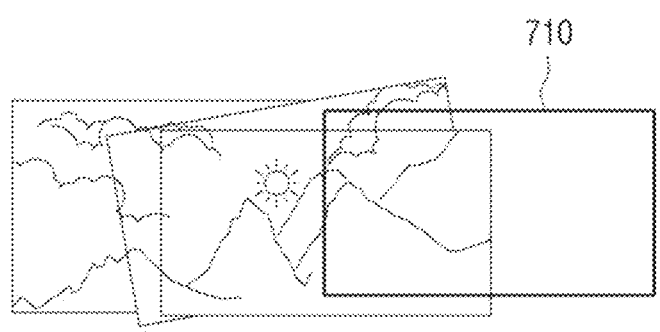
FIG. 7A is a view to explain a re-identification operation of an object according to an embodiment.
Figure 7B:
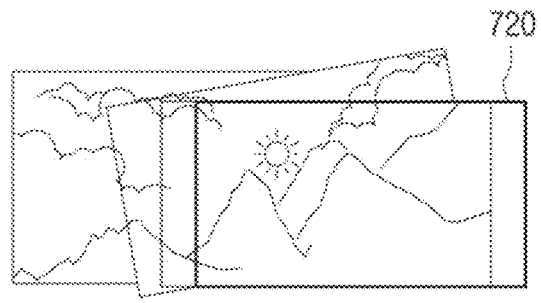
FIG. 7B is a view to explain a re-identification operation of an object according to an embodiment.

FIG. 7A and FIG. 7B are views to explain a re-identification operation of an object according to an embodiment.

The processor 120 may update a panoramic image by overlapping a partial area of the panoramic image with a partial area of the third frame based on the panoramic image and pixel information on the third frame captured after the first frame, identify a square area of maximum size in the updated panoramic image, and re-identify an object in the identified square area. The third frame may be a frame captured after the first frame.

Referring to FIG. 7A, if a ratio between the first frame with respect to the size of the third frame 710 and the overlapping area of the third frame 710 is smaller than a predetermined ratio, the processor 120 may re-identify an object within the updated panoramic image.

Referring to FIG. 7B, if a ratio between the first frame with respect to the size of the third frame 710 and the overlapping area of the third frame 710 is equal to or greater than a predetermined ratio, the processor 120 may not perform a re-identification operation. That is, the processor 120 may not perform a re-identification operation of the object when image blur is insignificant or when the change or motion between the previous frame and the present frame is small.

Such operation may minimize processing of the processor 120, and enable real time object identification.

Figure 8:
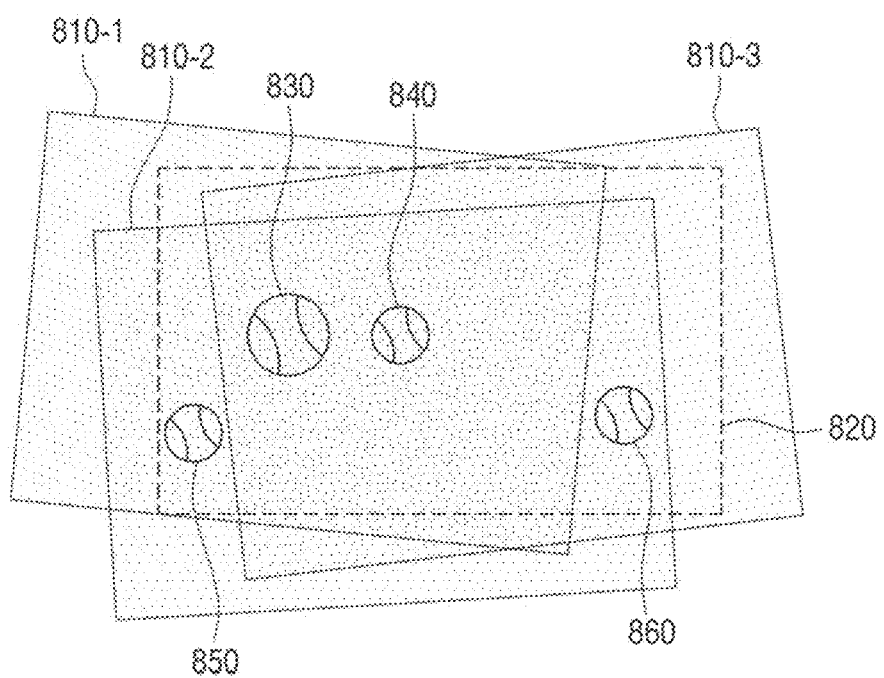
FIG. 8 is a view to explain a method for identifying a final object according to an embodiment.

FIG. 8 is a view to explain a method for identifying a final object according to embodiment.

FIG. 8 is a view illustrating a panoramic image in which three frames 810-1, 810-2 and 810-3 are overlapped with one another and a square area 820 of maximum size in a panoramic image. It is assumed that the capturing times of the three frames are in an order of 810-1, 810-2, and 810-3. That is, it is assumed that the 810-3 frame is lastly overlapped with the panoramic image.

The processor 120, when a plurality of objects are identified from a panoramic image, may assign a weighted value to each of the plurality of areas based on at least one of the number of overlapping frames of the plurality of respective panoramic images, the capturing time of the frames in the plurality of respective area, and identify at least one of the plurality of objects based on the weighted value of each of the plurality of areas.

For example, the first object 830 and the second object 840 may be assigned a higher weighted value for being present in a greater number of overlapping frames than the third object 850 and the fourth object 860. The fourth object 860 may be assigned a higher weighted value than the third object 850 based on a capturing time of the frame. The first object 830 and the second object 840 may have the same weighted value. However, the processor 120 may assign a weighted value considering the size of the object. In this case, the first object 830 may be assigned a higher weighted value than the second object 840.

Through such method, the processor 120 may identify a final object among a plurality of objects.

However, the disclosure is not limited thereto. The processor 120 may identify a plurality of objects from the panoramic image.

Figure 9:
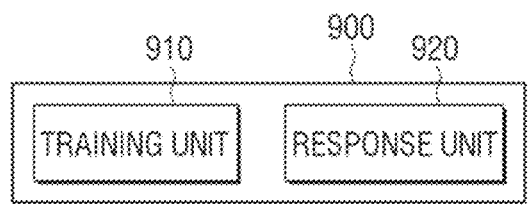
FIG. 9 is a block diagram illustrating an electronic apparatus according to an embodiment.

FIG. 9 is a block diagram of an electronic apparatus 900 according to an embodiment. The electronic apparatus 900 may be an apparatus for stabilizing a motion value through an artificial algorithm.

Referring to FIG. 9, the electronic apparatus 900 may include a training unit 910 and a response unit 920.

The training unit 910 may generate or train an artificial intelligence model for stabilizing a motion value by using training data. The training unit 910 may generate an identification model having identification criteria by using collected training data.

The response unit 920 may stabilize a plurality of motion values by using predetermined data as input data of the trained artificial intelligence model.

As an example, the training unit 910 and the response unit 920 may be included in the electronic apparatus 900. However, the disclosure is not limited thereto, and the training unit 910 and the response unit 920 could be mounted in the electronic apparatus 100. To be specific, at least part of the training unit 910 and at least part of the response unit 920 may be embodied as a software module or at least one hardware chip to be mounted on the electronic apparatus 100. For example, at least one of the training unit 910 and the response unit 920 may be manufactured as a hardware chip for artificial intelligence (AI), or part of a conventional general processor (e.g., a CPU or an application processor), or a graphic processor (e.g., a CPU) to be mounted on various electronic apparatuses as described above. A hardware chip for artificial intelligence may be a processor specialized for probability calculation, and has a higher capacity of parallel processing than a conventional general process to quickly process an operation in the artificial intelligence field such as machine training. When the training unit 910 and the response unit 920 are embodied as a software module (or a program module including instruction), computer code of the software module may be stored in a non-transitory computer readable media that is readable by a computer. In this case, the software module may be executed under the control of an operating system (OS) or a predetermined application. Part of the software module may be provided by the operating system (OS), and another part may be provided by the predetermined application.

The training unit 910 and the response unit 920 may be mounted in one electronic apparatus, or respectively mounted in separate electronic apparatuses. For example, one of the training unit 910 and the response unit 920 may be included in the electronic apparatus 100, and the other one may be included in the electronic apparatus 900. The training unit 910 and the response unit 920 may provide model information established by the training unit 910 to the response unit 920, by wire or wirelessly, and data input to the training unit 920 may be provided to the training unit 910 as additional training data.

Figure 10:
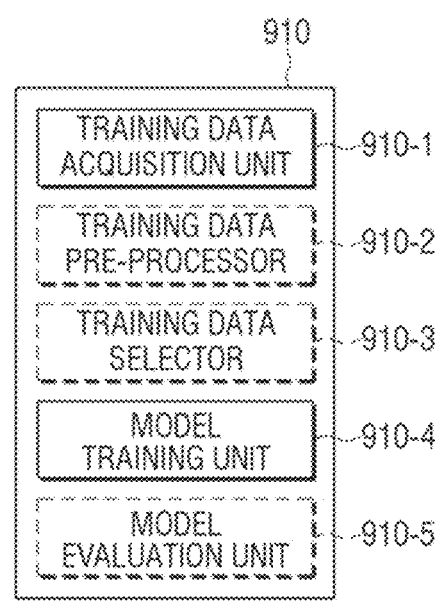
FIG. 10 is a block diagram of a training unit according to an embodiment.

FIG. 10 is a block diagram of a training unit 910 according to an embodiment.

Referring to FIG. 10, the training unit 910 according to an example embodiment may include a training data acquisition unit 910-1 and a model training unit 910-4. The training unit 910 may further include a training data preprocessor 910-2, a training data selector 910-3, and a model evaluation unit 910-5.

The training data acquisition unit 910-1 may obtain training data necessary for an artificial intelligence model for stabilizing a motion value. As an example, the training data acquisition unit 910-1 may obtain a plurality of motion values and the plurality of converted motion values as training data. The training data may be data collected or tested by the training unit 910 or the manufacturer of the training unit 910.

The model training unit 910-4 may train an artificial intelligence model to have criteria for stabilizing motion values by using training data. For example, the model training unit 910-4 may train an artificial intelligence model using at least part of the training data through supervised learning. The model training unit 910-4, for example, may train by itself using training data without any further direction, and train an artificial intelligence model through unsupervised learning for finding criteria for stabilizing a motion value. In addition, the model learning unit 910-4 may train the artificial intelligence model through reinforcement learning using, for example, feedback as to whether the result of providing the response according to learning is correct. The model learning unit 910-4 may also train the artificial intelligence model using, for example, a training algorithm including an error back-propagation method or a gradient descent method.

The model training unit 910-4 may train criteria as to which training data to be used for stabilizing a motion value by using input data.

When there are a plurality of pre-established artificial intelligence models, the model training unit 910-4 may identify an artificial intelligence model having a high relevance between the input training data and base training data as an artificial intelligence model to be trained. In this case, the base training data may be pre-classified by data type, and the artificial intelligence model may be pre-established by data type.

When an artificial intelligence model is trained, the model training unit 910-4 may store the trained artificial intelligence model. The model training unit 910-4 may store the trained artificial intelligence model in the memory of the electronic apparatus 900. The model training unit 910-4 may store the trained artificial intelligence model in the server or the memory of the electronic apparatus that is connected to the electronic apparatus 900 in a wired or wireless network.

The training unit 910 may further include a training data pre-processor 910-2 or the training data selector 910-3 to improve a response result of an artificial intelligence model or save resources or time necessary for generating an artificial intelligence model.

The training data pre-processor 910-2 may preprocess the obtained data so that the obtained data may be used for training to stabilize a motion value. The training data pre-processor 910-2 may manufacture the obtained data in a predetermined format. For example, the training data pre-processor 910-2 may separate a plurality of motion values into a plurality of sections.

The training data selector 910-3 may select data necessary for training from between data acquired from the training data acquisition unit 910-1 and data pre-processed by the training data pre-processor 910-2. The selected training data may be provided to the model training unit 910-4. The training data selector 910-3 may select training data necessary for training from among data acquired or pre-processed according to predetermined identification criteria. The training data selector 910-3 may select training data according to predetermined identification criteria by the training of the model training unit 910-4.

The training unit 910 may further include a model evaluation unit 910-5 for improving a response result of the artificial intelligence model.

The model evaluation unit 910-5 may input evaluation data into an artificial intelligence model, and if the response result output from the evaluation data does not satisfy predetermined criteria, may allow the model training unit 910-4 to train again. In this case, the evaluation data may be pre-defined data for evaluating the artificial intelligence model.

When there are a plurality of trained artificial intelligence models, the model training unit 910-5 may evaluate whether each trained artificial intelligence model satisfies predetermined criteria, and identify a model that satisfies the predetermined criteria as a final artificial intelligence model. When there are a plurality of models that satisfy predetermined criteria, the model evaluation unit 910-5 may identify any one or a predetermined number of pre-set models in the order of higher evaluation scores as a final artificial intelligence model.

Figure 11:
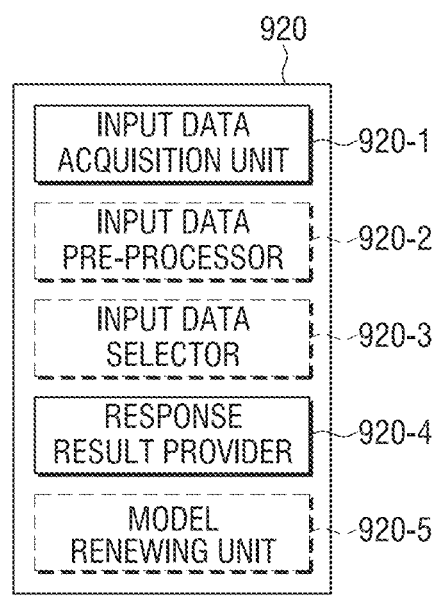
FIG. 11 is a block diagram of a response unit according to an embodiment.

FIG. 11 is a block diagram illustrating a response unit 920 according to an embodiment.

Referring to FIG. 11, a response unit 920 according to an embodiment may include an input data acquisition unit 920-1 and a response result provider 920-4.

The response unit 920 may further include an input data pre-processor 920-2, an input data selector 920-3, and a model renewing unit 920-5.

The input data acquisition unit 920-1 may obtain data necessary for stabilization of a motion value. The response result provider 920-4 may apply the input data obtained from the input data acquisition unit 920-1 to an artificial intelligence model trained as an input value and stabilize a motion value. The response result provider 920-4 may apply data selected by the input data pre-processor 920-2 or the input data selector 920-3 as an input value and obtain a response result. The response result may be identified by the artificial intelligence model.

The response result provider 920-4 may apply an artificial intelligence module for stabilizing a motion value acquired from the input data acquisition unit 920-1 and stabilize the motion value from a dialog.

The response unit 920 may further include an input data pre-processor 920-2 or an input data selector 920-3 by improving a response result of an artificial intelligence model, or saving resources or times for providing a response result.

The input data pre-processor 920-2 may preprocess the obtained data so that the obtained data could be used for stabilizing a motion value. That is, the input data pre-processor 920-2 may manufacture the data obtained from the response result provider 920-4 in a predefined format.

The input data selector 920-3 may select data necessary for providing a response from between data obtained from the input data acquisition unit 920-1 and data pre-processed by the input data pre-processor 920-2. The selected data may be provided to the response result provider 920-4. The input data selector 920-3 may select part or all of the obtained or pre-processed data according to predetermined identification criteria for providing a response. The input data selector 920-3 may select data according to a selection criteria predetermined by the training of the model training unit 910-4.

The model renewing unit 920-5 may control the artificial intelligence model to be renewed based on a response result provided by the response result provider 920-4. For example, the model renewing unit 920-5 may provide a response result provided by the response result provider 920-4 to the model training unit 910-4, and request the model training unit 910-4 to additionally train or renew the artificial intelligence model.

Figure 12:
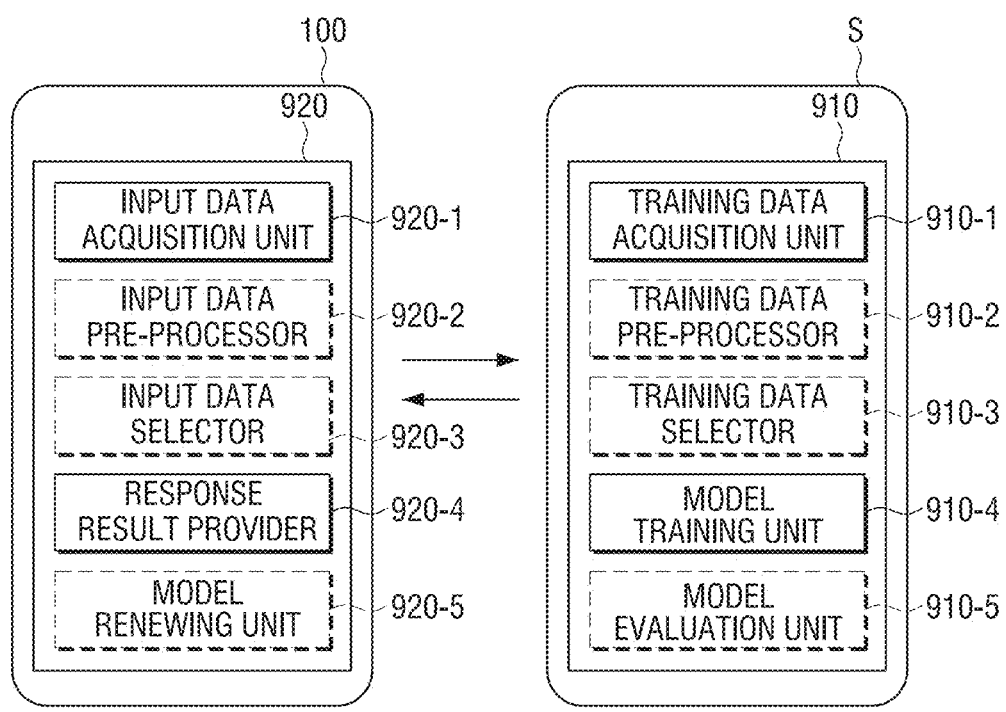
FIG. 12 is a view illustrating an example in which an electronic apparatus is operable in association with an external server to train and judge data according to an embodiment.

FIG. 12 is a view illustrating an example in which an electronic apparatus 100 is operable in association with an external server (S) to train and judge data according to an embodiment.

Referring to FIG. 12, the external server (S) may train criteria for stabilizing a motion value from a dialogue, and the electronic apparatus 100 may stabilize a motion value based on the training result by the server (S).

The model training unit 910-4 of the server S may perform the function of the training unit 910 as shown in FIG. 10. The model training unit 910-4 of the server S may train the criteria as to which filter to be used for stabilizing a motion value or how to stabilize a motion value by using the information.

The response result provider 920-4 of the electronic apparatus 100 may stabilize a motion value by applying the data selected by the input data selector 920-3 to the artificial intelligence model generated by the server S. The response result provider 920-4 of the electronic apparatus 100 may receive an artificial intelligence model generated by the server (S) from the server (S), and stabilize a motion value by using the received artificial intelligence model.

Figure 13:
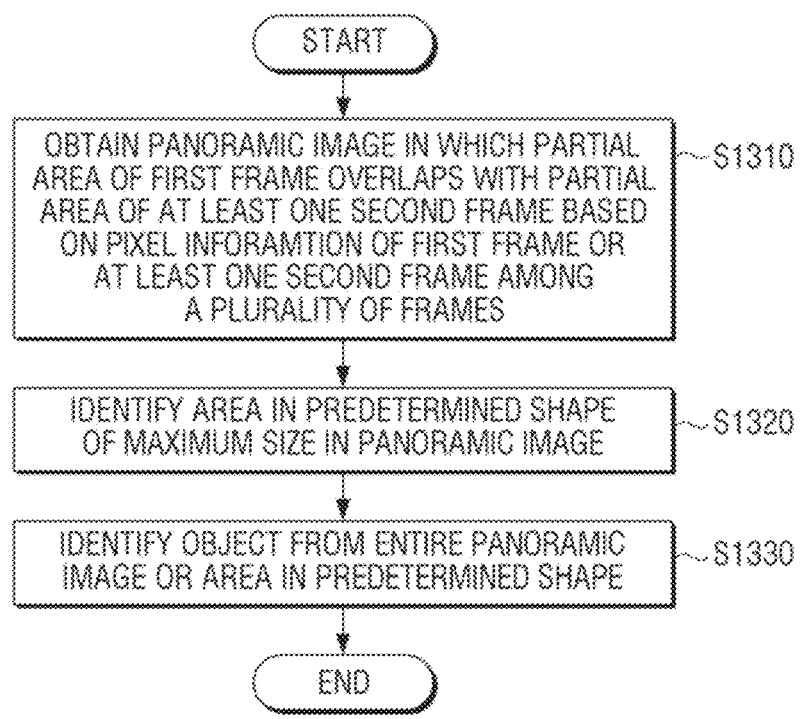
FIG. 13 is a flowchart of a method for controlling an electronic apparatus according to an embodiment.

FIG. 13 is a flowchart of a method for controlling an electronic apparatus according to an embodiment.

A panoramic image by overlapping a partial area of the first frame with a partial area of the at least one second frame based on pixel information on the first frame and the at least one second frame among a plurality of frames may be obtained at step S1310. An area in a predetermined shape of maximum size may be identified within the panoramic image at step S1320. The object may be identified from the entire panoramic image or the area in the predetermined shape at step S1330.

The obtaining at step S1310 may comprise obtaining a panoramic image by overlapping an area having a smallest difference between pixel values in adjacent frames based on pixel information on each of the first frame and at least one second frame.

The obtaining at step S1310 may comprise obtaining a motion value between adjacent frames based on pixel information on each of the first frame and the at least one second frame, and obtain a panoramic image by overlapping the partial area of the first frame with the partial area of the least one second frame based on the obtained motion value.

The obtaining S1310 may comprise converting the obtained motion value based on a difference between pixel values in adjacent frames and a motion value between adjacent frames, and obtaining a panoramic image by overlapping the partial area of the first frame with the partial area of the second frame based on the converted motion value.

The obtaining S1310 may comprise performing at least one of image processing such as rotation, position movement or resizing with respect to the first frame and the at least one second frame based on pixel information on each of the first frame and the at least one second frame.

The displaying may further comprise displaying the first frame, and based on an object being identified from a panoramic image, displaying an object including at least one of graphical user interface (GUI), character, image, video, or 3D model on an area in which the object is displayed in the first frame based on the information on the location at which the object is identified from the panoramic image and image processing information.

The at least one second frame may be a frame captured preceding or immediately preceding the first frame, and the method may further include updating a panoramic image by overlapping the partial area of the panoramic image with the partial area of the third frame based on the panoramic image and the pixel information on the third frame captured after the first frame, identifying area in a predetermined shape of maximum size within the updated panoramic image, and re-identifying an object in the updated panoramic image or the predetermined shape within the updated panoramic image.

The third frame may be a frame captured immediately succeeding the first frame, and re-identifying the object may comprise, if a ratio between the first frame with respect to the third frame and the overlapping area of the third frame, re-identifying an object within the updated panoramic image or in the area of the predetermined shape within the updated panoramic image.

When a plurality of objects are identified from the panoramic image, the method may include assigning a weighted value to each of the plurality of areas based on at least one of the number of overlapping frames of the respective plurality of areas or a capturing time of the frame in each of the plurality of areas, and identifying at least one of the plurality of objects based on the weighted value of each of the plurality of areas.

The method may further include obtaining a plurality of frames by performing continuous capturing through a camera provided in an electronic apparatus.

According to various embodiments of the disclosure, the electronic apparatus may generate a panoramic image from the plurality of continuous frames, and improve the accuracy of the object identification by identifying an object.

According to various embodiments of the disclosure, an application can be mounted on a conventional electronic apparatus.

The methods according to various embodiments of the disclosure may be embodied software and hardware with respect to a conventional electronic apparatus.

According to various example embodiments of the disclosure can be performed by an embedded server provided in an electronic apparatus, an electronic apparatus or a display apparatus.

Various embodiments of the disclosure may be implemented as software including commands stored in machine-readable storage media. The machine may be an apparatus that calls a command stored in a storage medium and is operable according to the called command, including an electronic apparatus in accordance with the disclosed example embodiments (e.g., an electronic apparatus (A)). When the command is executed by a processor, the processor may perform the function corresponding to the command, either directly or under the control of the processor, using other components. The command may include code generated or executed by a compiler or an interpreter. The machine-readable storage medium may be provided in the form of a non-transitory storage medium. The 'non-temporary' means that the storage medium does not include a signal but is tangible, but does not distinguish whether data is stored semi-permanently or temporarily on a storage medium.

According to an embodiment, the methods according to various embodiments disclosed herein may be provided in a computer program product. A computer program product may be traded between a seller and a purchaser as a commodity. A computer program product may be distributed in the form of a machine-readable storage medium (e.g., compact disc read only memory (CD-ROM)) or distributed online through an application store (e.g., PlayStore™). In the case of on-line distribution, at least a portion of the computer program product may be temporarily stored, or temporarily created, on a storage medium such as a manufacturer's server, a server of an application store, or a memory of a relay server.

Each of the components (e.g., modules or programs) according to various embodiments may consist of a single entity or a plurality of entities, and some subcomponents of the abovementioned subcomponents may be omitted, or other components may be further included in various embodiments. Alternatively or additionally, some components (e.g., modules or programs) may be integrated into one entity to perform the same or similar functions performed by each component prior to integration. Operations performed by modules, programs, or other components, in accordance with various embodiments, may be executed sequentially, in parallel, repetitively, or heuristically, or at least some operations may be performed in a different order, or omitted, or another function may be further added.

Although embodiments have been shown and described, those skilled in the art will appreciate that changes may be made to these embodiments without departing from the principles and spirit of the disclosure. Accordingly, the scope of the disclosure is not construed as being limited to the described embodiments, but is defined by the appended claims as well as equivalents thereto.

What is claimed is:

1. An electronic apparatus, comprising:
a memory; and
a processor configured to:
obtain a panoramic image by overlapping a partial area of a first image frame stored in the memory with a partial area of at least one second image frame stored in the memory based on pixel information of the first image frame and pixel information of the at least one second image frame,
identify an area of a predetermined shape of maximum size within the panoramic image,
identify a plurality of objects in the panoramic image or the area in the predetermined shape,
identify a plurality of areas including the plurality of objects,
assign a weighted value to the plurality of areas based on at least one of a number of overlapping image frames of the plurality of areas or a capturing time of an image frame in the plurality of areas, and
identify at least one object among the plurality of objects based on the weighted value of the plurality of areas.

2. The electronic apparatus as claimed in claim 1, wherein the processor is further configured to obtain the panoramic image by overlapping an area having a minimum difference between pixel values of adjacent image frames among the first image frame and the at least one second image frame based on the pixel information of the first image frame and the pixel information of the at least one second image frame.

3. The electronic apparatus as claimed in claim 2, wherein the processor is further configured to:
obtain a motion value between the adjacent image frames among the first image frame and the at least one second image frame based on the pixel information of the first image frame and the pixel information of the at least one second image frame, and
obtain the panoramic image by overlapping the partial area of the first image frame with the partial area of the at least one second image frame based on the motion value.

4. The electronic apparatus as claimed in claim 3, wherein the processor is further configured to:
convert the motion value based on a difference between pixel values in the adjacent image frames and the motion value between the adjacent image frames, and
obtain the panoramic image by overlapping the partial area of the first image frame with the partial area of the at least one second image frame based on the converted motion value.

5. The electronic apparatus as claimed in claim 1, wherein the processor is further configured to:
perform image processing comprising at least one of rotation, position movement, or resizing with respect to each of the first image frame and the at least one second image frame based on the pixel information of the first image frame and the pixel information of the at least one second image frame, and
obtain the panoramic image by overlapping a partial area of a frame in which the image processing is performed.

6. The electronic apparatus as claimed in claim 5, further comprising:
a display,
wherein the processor is further configured to:
control the display to display the first image frame, and based on the at least one object identified from the panoramic image, control the display to display the at least one object including at least one of graphical user interface (GUI), character, image, video, or 3D model on an area in which the at least one object is displayed in the first image frame in accordance with information on a location at which the at least one object is identified and information on the image processing.

7. The electronic apparatus as claimed in claim 1, wherein the at least one second image frame is an image frame captured before the first image frame, and
wherein the processor is further configured to:
based on the panoramic image and pixel information on a third image frame captured after the first image frame, update the panoramic image by overlapping a partial area of the panoramic image with a partial area of the third image frame,
identify an area of a predetermined shape of maximum size within the updated panoramic image, and
re-identify at least one object from the updated panoramic image or the area in the predetermined shape within the updated panoramic image.

8. The electronic apparatus as claimed in claim 7, wherein the third image frame is an image frame captured after the first image frame, and
wherein the processor is further configured to, based on a ratio between the first image frame with respect to the third image frame and an overlapping area of the third image frame being smaller than a predetermined ratio, re-identify the at least one object from the updated panoramic image, or the area in the predetermined shape within the updated panoramic image.

9. The electronic apparatus as claimed in claim 1, further comprising:
a camera comprising circuitry,
wherein the processor is further configured to obtain a plurality of image frames by performing continuous capturing through the camera.

10. A method for controlling an electronic apparatus, the method comprising:
based on pixel information of a first image frame and pixel information of at least one second image frame among a plurality of frames, obtaining a panoramic image by overlapping a partial area of the first image frame with a partial area of the at least one second image frame;
identifying an area of a predetermined shape of maximum size within the panoramic image;
identifying a of a plurality of objects in the panoramic image or the area in the predetermined shape;
identifying a plurality of areas including the plurality of objects;
assigning a weighted value to the plurality of areas based on at least one of a number of overlapping image frames of the plurality of respective areas or a capturing time of an image frame in the plurality of areas; and
identifying at least one object among the plurality of objects based on the weighted value of the plurality of areas.

11. The method as claimed in claim 10, wherein the obtaining comprises obtaining the panoramic image by overlapping an area having a minimum difference between pixel values of adjacent image frames among the first image frame and the at least one second image frame based on the pixel information of the first image frame and the pixel information of the at least one second image frame.

12. The method as claimed in claim 11, wherein the obtaining comprises obtaining motion value between the adjacent image frames among the first image frame and the at least one second image frame based on the pixel information of the first image frame and the pixel information of the at least one second image frame, and
obtaining the panoramic image by overlapping the partial area of the first image frame with the partial area of the at least one second image frame based on the motion value.

13. The method as claimed in claim 12, wherein the obtaining comprises converting the motion value based on a difference between pixel values in the adjacent image frames and the motion value between the adjacent image frames, and
based on the converted motion value, obtaining the panoramic image by overlapping the partial area of the first image frame with the partial area of the at least one second image frame.

14. The method as claimed in claim 10, wherein the obtaining comprises performing image processing comprising at least one of rotation, position movement, or resizing with respect to each of the first image frame or the at least one second image frame based on the pixel information of the first image frame and the pixel information of the at least one second image frame, and obtaining the panoramic image by overlapping a partial area of a frame in which the image processing is performed.

15. The method as claimed in claim 14, further comprising:

displaying the first image frame; and based on the at least one object identified from the panoramic image, displaying the at least one object including at least one of graphical user interface (GUI), character, image, video, or 3D model on an area in which the at least one object is displayed in the first image frame based on information on a location at which the at least one object is identified from the panoramic image and information on the image processing.

16. The method as claimed in claim 10, wherein the at least one second image frame is an image frame captured before the first image frame, and wherein the method further comprises:

based on the panoramic image and pixel information on a third image frame captured after the first image frame, updating the panoramic image by overlapping a partial image of the panoramic image with a partial area of the third image frame;

identifying an area of a predetermined shape of maximum size within the updated panoramic image; and re-identifying at least one object from an entire area of the updated panoramic image or the area in the predetermined shape within the updated panoramic image.

17. The method as claimed in claim 16, wherein the third image frame is an image frame captured after the first image frame, and wherein the re-identifying of the at least one object comprises, based on a ratio between the first image frame with respect to the third image frame and an overlapping area of the third image frame being smaller than a predetermined ratio, re-identifying the at least one object from the updated panoramic image, or the area in the predetermined shape within the updated panoramic image.

18. The method as claimed in claim 10, further comprising:

obtaining the plurality of frames by performing continuous capturing through a camera provided in the electronic apparatus.

\* \* \* \* \*